United States Patent
Wilhelm

(10) Patent No.: US 7,224,131 B2
(45) Date of Patent: *May 29, 2007

(54) HIGH EFFICIENCY LIGHTING SYSTEM

(75) Inventor: William George Wilhelm, Mastic, NY (US)

(73) Assignee: NEXTEK Power Systems, Inc., Hauppauge, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/007,965

(22) Filed: Dec. 8, 2004

(65) Prior Publication Data

US 2005/0099138 A1    May 12, 2005

Related U.S. Application Data

(63) Continuation of application No. 08/820,496, filed on Mar. 19, 1997, now Pat. No. 6,933,627, which is a continuation-in-part of application No. 08/606,219, filed on Mar. 7, 1996, now Pat. No. 5,786,642, which is a continuation-in-part of application No. 08/328,574, filed on Oct. 24, 1994, now Pat. No. 5,500,561, which is a continuation of application No. 08/129,375, filed on Sep. 30, 1993, now Pat. No. 5,363,333, which is a continuation of application No. 07/944,796, filed on Sep. 14, 1992, now abandoned, which is a continuation of application No. 07/638,637, filed on Jan. 8, 1991, now abandoned.

(51) Int. Cl.
*H05B 37/00*    (2006.01)

(52) U.S. Cl. .......................... 315/312; 307/64; 307/66
(58) Field of Classification Search ................ 307/66, 307/64, 62, 65, 82, 85; 315/312, 86, 209 R, 315/224; 363/56, 79
See application file for complete search history.

(56) References Cited

U.S. PATENT DOCUMENTS

| 4,891,740 A * | 1/1990 | Brown ..................... 363/21.13 |
| 5,089,974 A | 2/1992 | Demeyer et al. ........... 364/492 |
| 5,477,091 A | 12/1995 | Fiorina et al. ................. 307/66 |
| 5,969,435 A * | 10/1999 | Wilhelm ....................... 307/64 |
| 6,933,627 B2 * | 8/2005 | Wilhelm ....................... 307/66 |

* cited by examiner

*Primary Examiner*—Tuyet Vo
*Assistant Examiner*—Jimmy Vu
(74) *Attorney, Agent, or Firm*—Alfred M. Walker

(57) ABSTRACT

A high efficiency lighting system maintains normal lighting conditions by lighting fixtures requiring DC electrical power. A power control device receives AC electrical power from a public utility converts AC power to DC power and delivers low voltage DC electrical power to lighting fixtures. A standby battery is provided to maintain power during power outages. Optionally, a photovoltaic DC electrical power source may be connected to the power control device, to provide alternate DC electrical power. In a further embodiment, a gas driven cogenerator unit may supply DC electrical power.

8 Claims, 11 Drawing Sheets

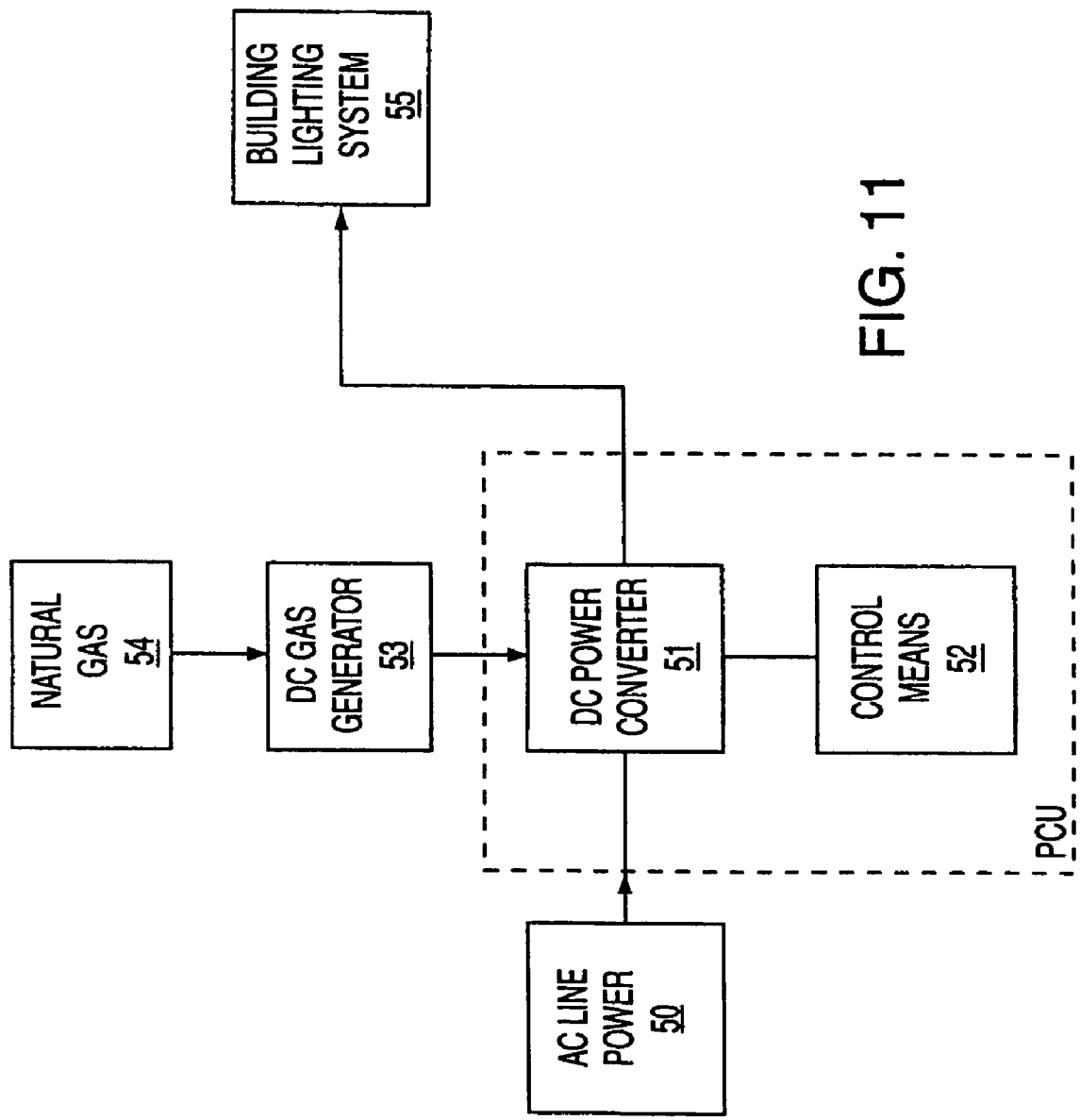

HIGH EFFICIENCY LIGHTING SYSTEM

This application is a continuation of application Ser. No. 08/820,496, filed Mar. 19, 1997 (U.S. Pat. No. 6,933,627), which application is a continuationin-part of application Ser. No. 08/606,219 filed Mar. 7, 1996 (U.S. Pat. No. 5,786,642), which is a continuation-in-part of application Ser. No. 08/328,574, filed Oct. 24, 1994, now U.S. Pat. No. 5,500,561 dated Mar. 19, 1996, which was a continuation of application Ser. No. 08/129,375, filed Sep. 30, 1993 (U.S. Pat. No. 5,363,333), which is a continuation of application Ser. No. 07/944,796, filed Sep. 14, 1992 now abandoned, which is a continuation of application Ser. No. 07/638,637, filed Jan. 8, 1991 now abandoned.

BACKGROUND OF THE INVENTION

The field of the invention is high efficiency uninterruptable lighting systems.

Uninterruptable power supplies are well known accessories especially when applied to computer equipment to "ride out" brief power outages so that no data is lost or compromised. Some have more battery storage capability so that operation may be maintained for an extended outage. Some special lighting systems are also protected in a similar fashion by an uninterruptable power source for critical applications such as operating rooms in hospitals. In lieu of such systems, reduced amounts of auxiliary emergency lighting is provided for special areas by modular systems which are only engaged during power outages; these modules are often used in stairwells and consist of a housing enclosing a battery, charger, power sensor and one or two flood lamps.

These prior art systems do nothing to enhance lighting efficiency, and would not be considered as substitutes for conventional lighting.

OBJECTS OF THE INVENTION

It is an object of this invention to provide an uninterruptable lighting system that can be routinely substituted for conventional building or office lighting.

It is another object of this invention to provide high efficiency operation with lower operating cost than conventional incandescent and fluorescent lighting systems.

It is yet another object of this invention to provide long term uninterruptability (3 hours+) with small storage volumes.

It is an object of this invention to provide optimum battery management for long storage life, ultra low maintenance, and economical operation.

It is a further object of this invention to provide for economical connection to an alternate energy source such as a solar photovoltaic (PV) panel.

It is another object of this invention to provide a system with enhanced safety through low voltage operation between the power control unit and the lighting fixtures.

It is yet another object to achieve high power quality with low interference through very high power factor and low total harmonic distortion.

It is an object of this invention to provide for expansion of the lighting system through a modular approach to increase subsystem and component standardization to reduce cost.

SUMMARY OF THE INVENTION

In keeping with these objects and others which may become apparent, the present invention includes a high efficiency lighting system for maintaining normal lighting conditions by lighting fixtures requiring DC electrical power.

The system includes a power control means for receiving AC electrical power from a grid source and delivering required low voltage DC electrical power to the lighting fixtures. The power control means converts the AC electrical power to DC electrical power.

A battery provides, on a standby basis, the required DC low voltage electrical power to the power control means. The battery is connected to the power control means so that the battery may be maintained in a fully charged condition by the power control means during normal supply of AC electrical power from the grid source.

The power control means delivers required DC electrical power from the battery to the lighting fixtures during an AC electrical power outage to maintain the power without interruption.

The power control means can be a plurality of multiple power control means, each connected to its own battery for maintaining the lighting in a building with multiple rooms.

An optional photovoltaic source of DC electrical power may be connected to the power control means for reducing the amount of electrical power taken from said grid source.

The battery provides, on a standby basis, DC low voltage electrical power to the power control means, which power control means maintains the battery in a fully charged condition by electrical power from an AC grid source.

In a version using AC power input only without an auxiliary battery or photovoltaic panel, the high efficiency lighting system for maintaining normal lighting conditions of lighting fixtures requiring DC electrical power, includes the power control means for receiving AC electrical power from a grid source and delivering required DC electrical power to the lighting fixtures, as well as a power control means converting AC electrical power to DC electrical power.

In a further embodiment for remote use, such as a remote campsite without access to conventional AC power, a high efficiency lighting system maintains normal lighting conditions of lighting fixtures requiring DC electrical power. The remote system includes a power control means for receiving DC electrical power from a photovoltaic panel and delivering required low voltage DC electrical power to the remote lighting fixtures, and the power control means controls charging of a battery.

The battery also provides, on a standby basis, the required DC low voltage electrical power to the power control means. It is connected to the power control means while being maintained in a charged condition by the power control means, during daylight hours of input of power from the photovoltaic panel.

Moreover, the power control means delivers required DC electrical power from the battery to the lighting fixtures during periods of time when power from the photovoltaic panel is not available, such as at night times.

The present invention also provides A DC power supply system for DC loads requiring DC electrical power that includes power control means for receiving AC electrical power from a grid source and delivering required low voltage DC electrical power to said DC load. It converts the AC electrical power to DC electrical power.

In addition, one embodiment of the present invention includes a battery means that provides required DC low voltage electrical power on a standby basis to the power control means.

The battery means is connected to the power control means so as to permit the battery control means to maintain the battery in a fully charged condition during normal supply of AC electrical power from the AC grid source.

The power control means of the present invention delivers required DC electrical power from the battery means to a DC load during an AC electrical power outage so as to maintain normal operation of the DC load without interruption.

In addition, the present invention optionally provides a DC power supply system having a photovoltaic [PV] source of DC electrical power connected to the power control means in order to reduce the amount of electrical power taken from said grid source.

The DC power supply system of the present invention optionally further provides a cogeneration source of DC electrical power connected to the power control means to reduce the amount of electrical power taken from a grid source.

Further, the present invention alternatively provides a DC power supply for DC loads requiring DC electrical power. The DC power supply includes a separate power control means for receiving AC electrical power from a grid source. The DC power supply delivers required low voltage DC electrical power to a DC load. The power control means converts the AC electrical power to DC electrical power.

In addition, in an alternate embodiment, the DC power supply system for DC loads requiring DC electrical power includes a power control means for receiving DC electrical power from a DC power source and for delivering required low voltage DC electrical power to the DC load. The power control means is also directed toward the function of controlling charging of a battery means.

In this battery-charging embodiment, the present invention's battery means provides the required DC low voltage electrical power on a standby basis to the power control means.

Also, in this battery-charging embodiment, the battery means is connected to the power control means so as to maintain the power control means in a charged condition during hours of input from the DC power source.

Furthermore, in this battery-charging embodiment, the power control means delivers required DC electrical power from the battery means to the DC load during times when power from the DC power supply is not available.

The DC power supply system of the present invention further provides an optional embodiment wherein the DC power source is a cogeneration unit.

Alternatively, in a different embodiment of the present invention, the DC power supply system has a DC power source that is at least one photovoltaic panel.

In yet another embodiment of the present invention, the DC power supply system furnishes power to a DC load that is a household appliance. The household appliance may alternatively be a microwave oven, a heater, or any other household electrical device.

Furthermore, in further embodiments with or without access to conventional AC power, a DC generator (e.g.— powered by a natural gas engine) is used either as a primary source of electrical power or as a cogeneration companion to normal AC grid power. Thus the power control means can be supplied power for use by a high efficiency lighting system in much the same manner as DC electrical power is received from a photovoltaic panel.

It can be appreciated that any compatible DC load can be serviced by the power control means of this high efficiency lighting system in addition to DC ballasted fluorescent lighting or instead of the latter lighting load. These other DC loads can be supplied with standby power from a storage battery as well. Some examples of DC loads include household appliances, microwave ovens, and heaters.

BRIEF DESCRIPTION OF THE DRAWINGS

The present invention can best be understood in conjunction with the accompanying drawings, in which:

FIG. 11 is a block diagram of an alternate lighting system using natural gas cogeneration.

DETAILED DESCRIPTION OF THE INVENTION

Figure 1:
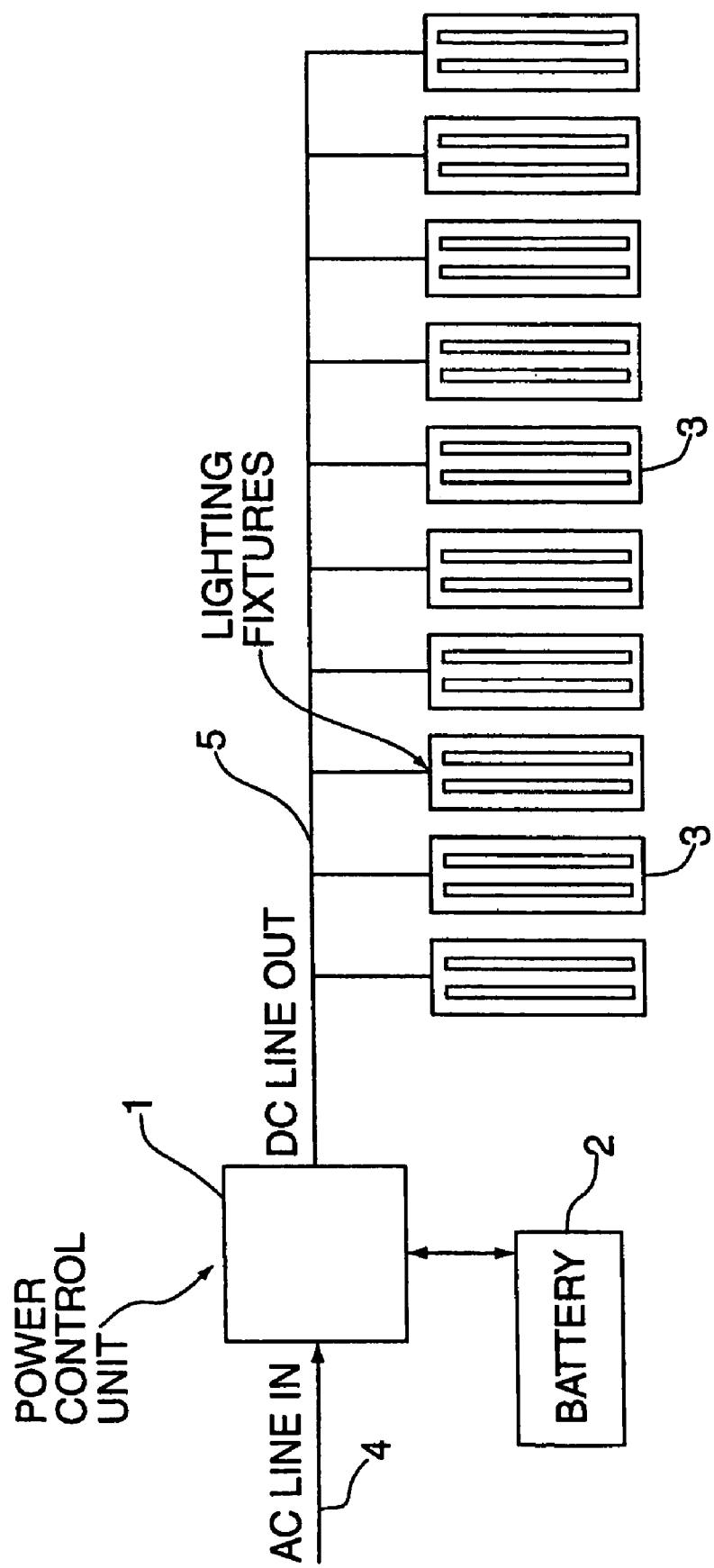
FIG. 1 is a block diagram of basic uninterruptable lighting system.

FIG. 1 shows a block diagram of the major components of an uninterruptable lighting system of this invention. It may be installed anywhere conventional building lighting is required. Unlike emergency lighting, this is a full service, high quality lighting product. It functions with standard fixtures and lamps, without compromise in output quality and with no flicker in the event of a power failure. This permits normal building activities to continue for several hours using battery storage without disruption of work activity due to loss of lighting. The key subsystem that ties the entire system together is the power control unit 1 which normally uses AC grid power to supply the lighting energy and keep the battery 2 charged. The lighting fixtures 3 are fluorescent tubes using electronic ballasts which have a low voltage (nominal 26.6 volts) DC input supplied by line 5 from power control unit (PCU) 1. During a power outage, the DC line 5 is supplied by battery 2.

Figure 2:
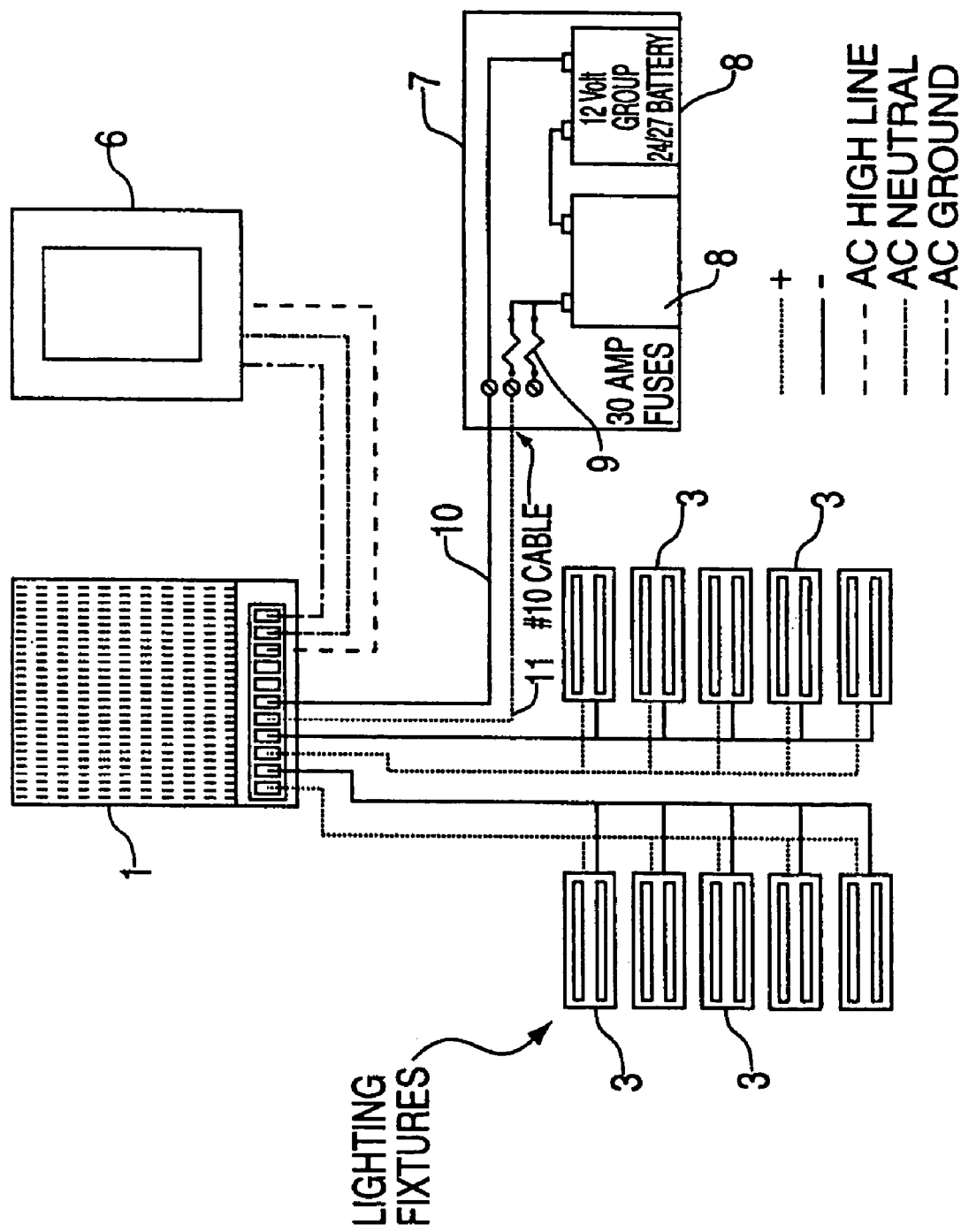
FIG. 2 is a physical block diagram of basic uninterruptable lighting system.

FIG. 2 shows a physical block diagram showing the AC electric service panel 6 with a three wire cable system supplying either 120 or 220 VAC to PCU 1. Battery case 7 contains two group 24/27 deep discharge lead acid storage batteries wired in series and through a 30 amp fuse to the PCU 1. The wiring to all lighting fixtures 3 is at a nominal 26.6 volts DC. In the preferred embodiment, each PCU can power ten two tube 48 inch T8 fluorescent fixtures or 20 single tube fixtures.

Figure 3:
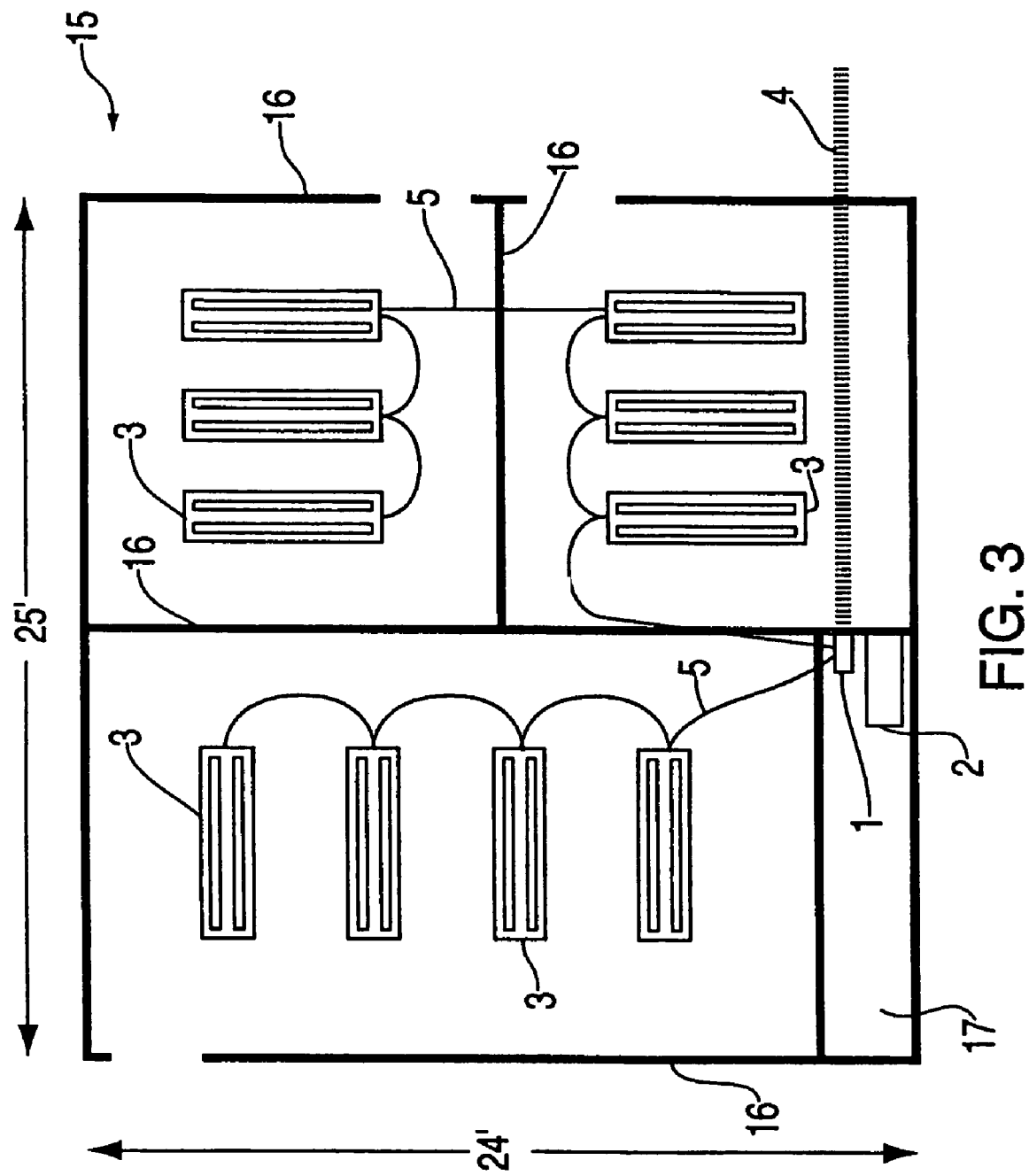
FIG. 3 is a wiring layout of a single lighting module.

FIG. 3 shows a wiring layout for three offices as controlled by a single PCU 1. A closet area 17 is used to house battery 2. The AC line 4 leads to PCU I which is placed in the ceiling cavity. The DC wiring 5 to the lighting fixtures is also in the ceiling cavity.

The 220 VAC input power to the PCU is 725 watts for an AC rms of approximately 3 amps. The equivalent 120 VAC unit will be about 6 amps. Because the PCU is power factor corrected to 0.99, a 20 amp circuit breaker and number 12 wire can support a maximum of 3 PCU's from a 120 volt line and 6 units from a 220 volt line for a total DC power output of about 2100 watts and 4200 watts respectively.

Figure 4:
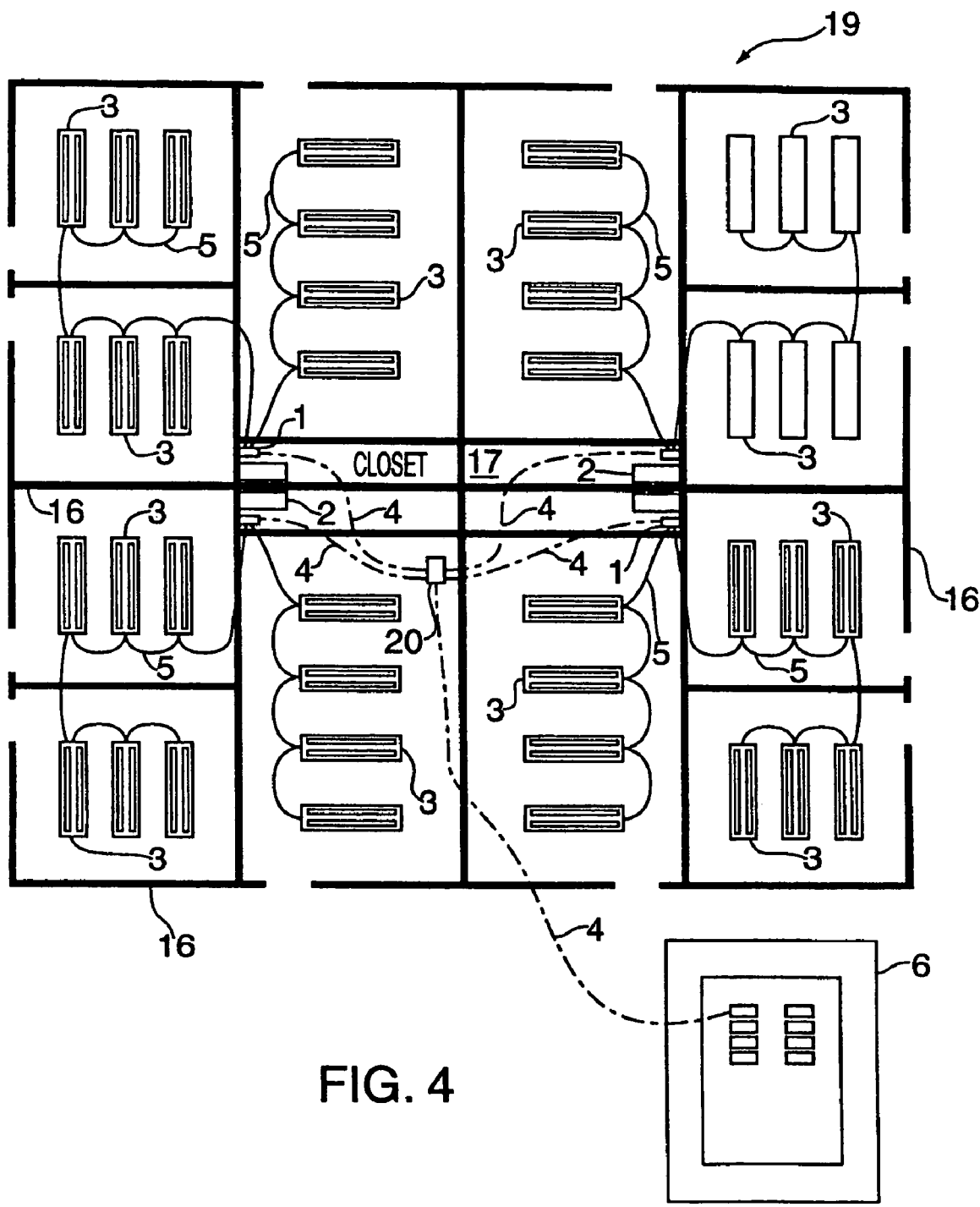
FIG. 4 is a wiring layout of a four module system.

FIG. 4 shows a wiring layout serving 8 small offices and four larger ones. This involves the use of four separate uninterruptable lighting systems using four PCU's 1 and four battery modules 2 located in four central closets 17. The four PCU's are supplied from a single 220 VAC circuit breaker in power panel 6 via AC cable 4 as distributed from distribution box 20. Each of the lighting systems supplies 10 two lamp fixtures 3.

Figure 5:
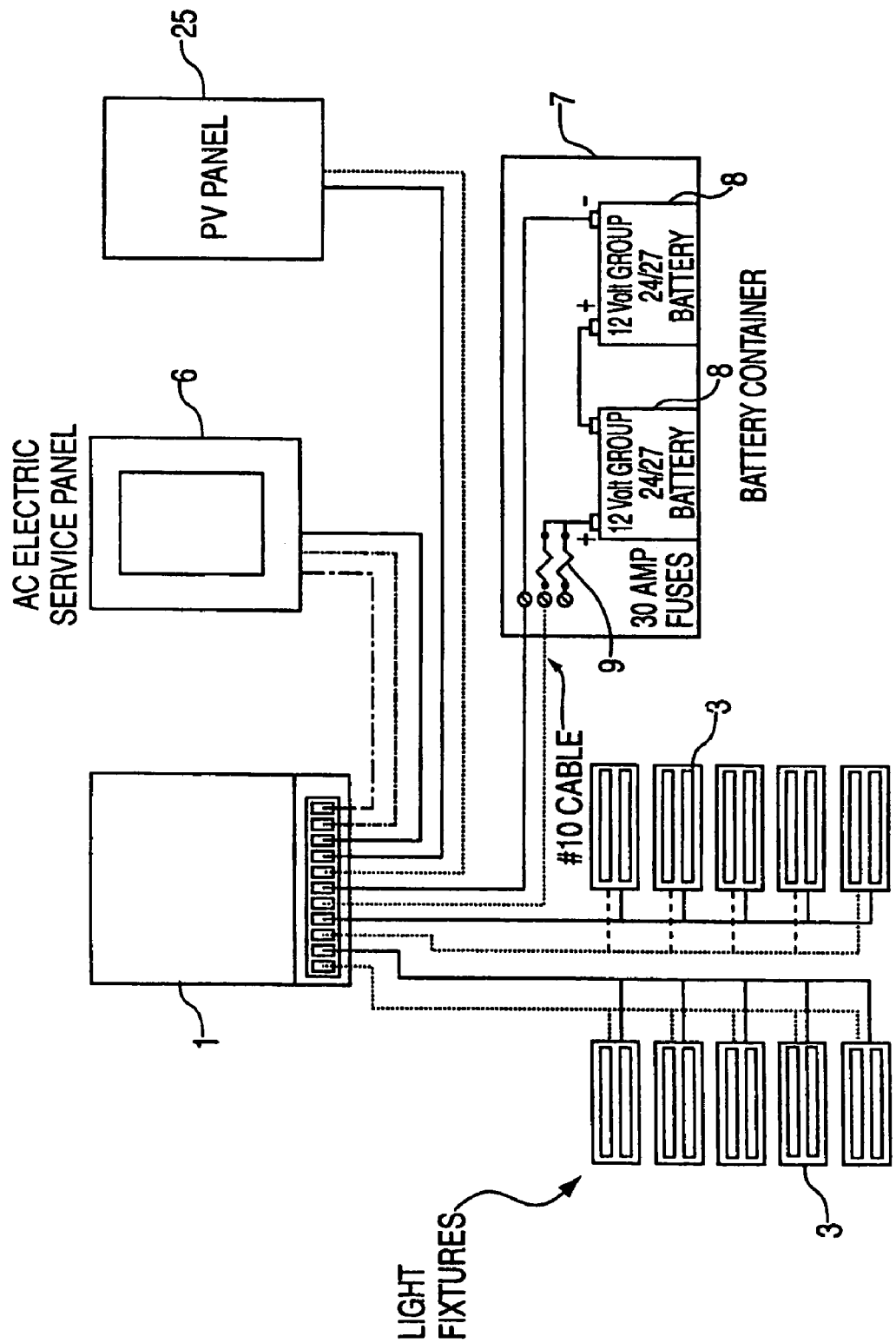
FIG. 5 is a block diagram of lighting system with a PV panel.

FIG. 5 shows an uninterruptable lighting system including a PV panel 25.

Figure 6:
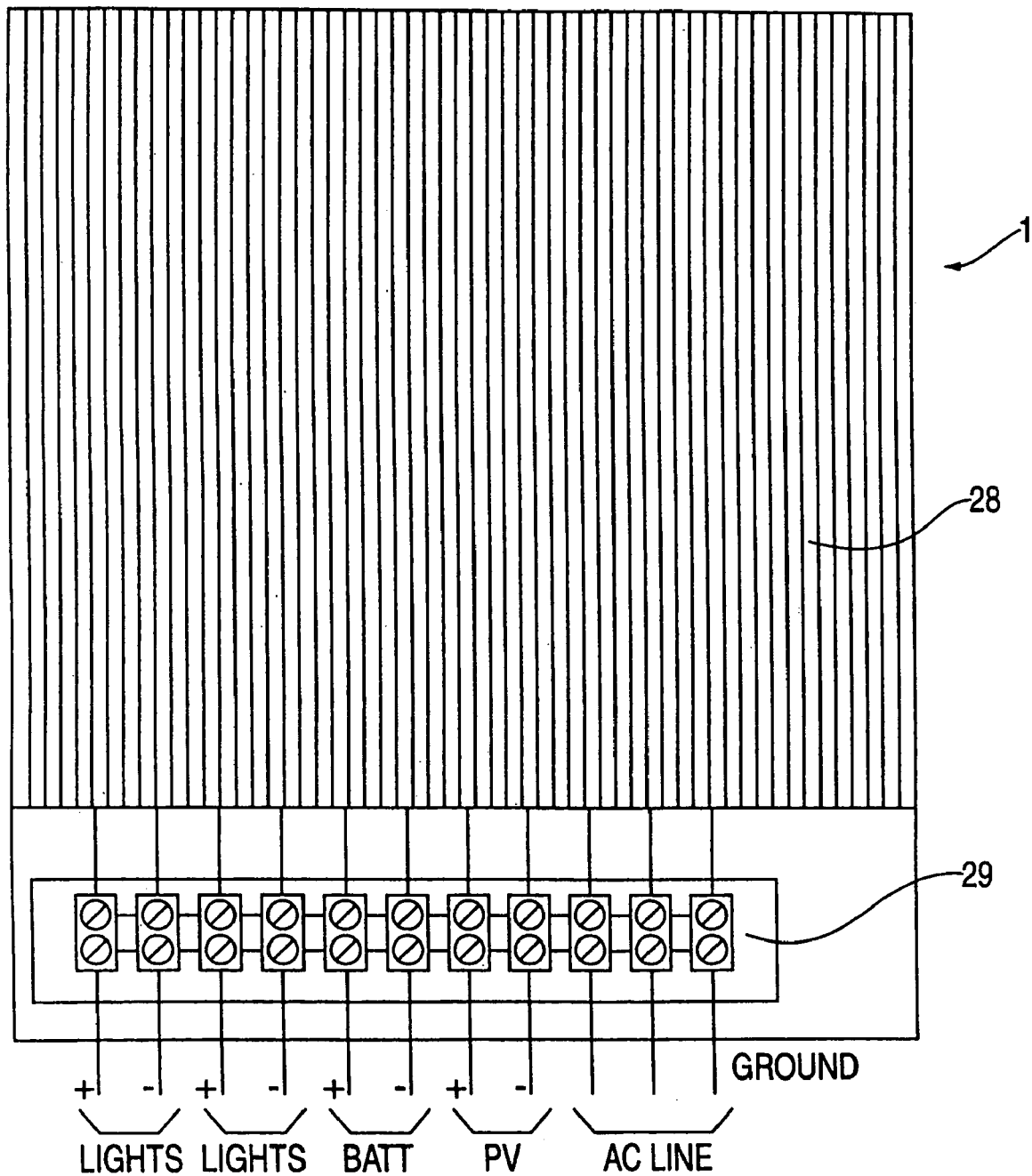
FIG. 6 is a front view of power control unit.

As shown in FIG. 6, a front view of PCU 1, it is simply wired to two terminals. This simple system configuration permits high security lighting using an AC line, battery back-up, and PV shared contribution. A system with the PCU alone attached to the AC line is a viable lighting system that can pay for itself by providing high efficiency DC lighting. By adding the battery subsystem, the user achieves uninterruptable lighting. By using a system without a battery but with AC input and a PV panel, the power savings of the PV contribution is achieved with the balance supplied by the AC input. In an area remote from the AC grid, a system using a PCU attached to a large PV panel and a larger battery can supply totally solar lighting. The PCU is sufficiently flexible to support all of these configurations of lighting systems. It can also supply other DC loads besides lighting, such as for example, household appliances, microwave ovens, heaters and the like. Furthermore, it can also alternately accept external DC power from many varied sources such as wind generators or engine powered generators.

FIG. 6 shows a front view of PCU 1 with finned heat sink 28 and terminal strip 29.

Figure 7:
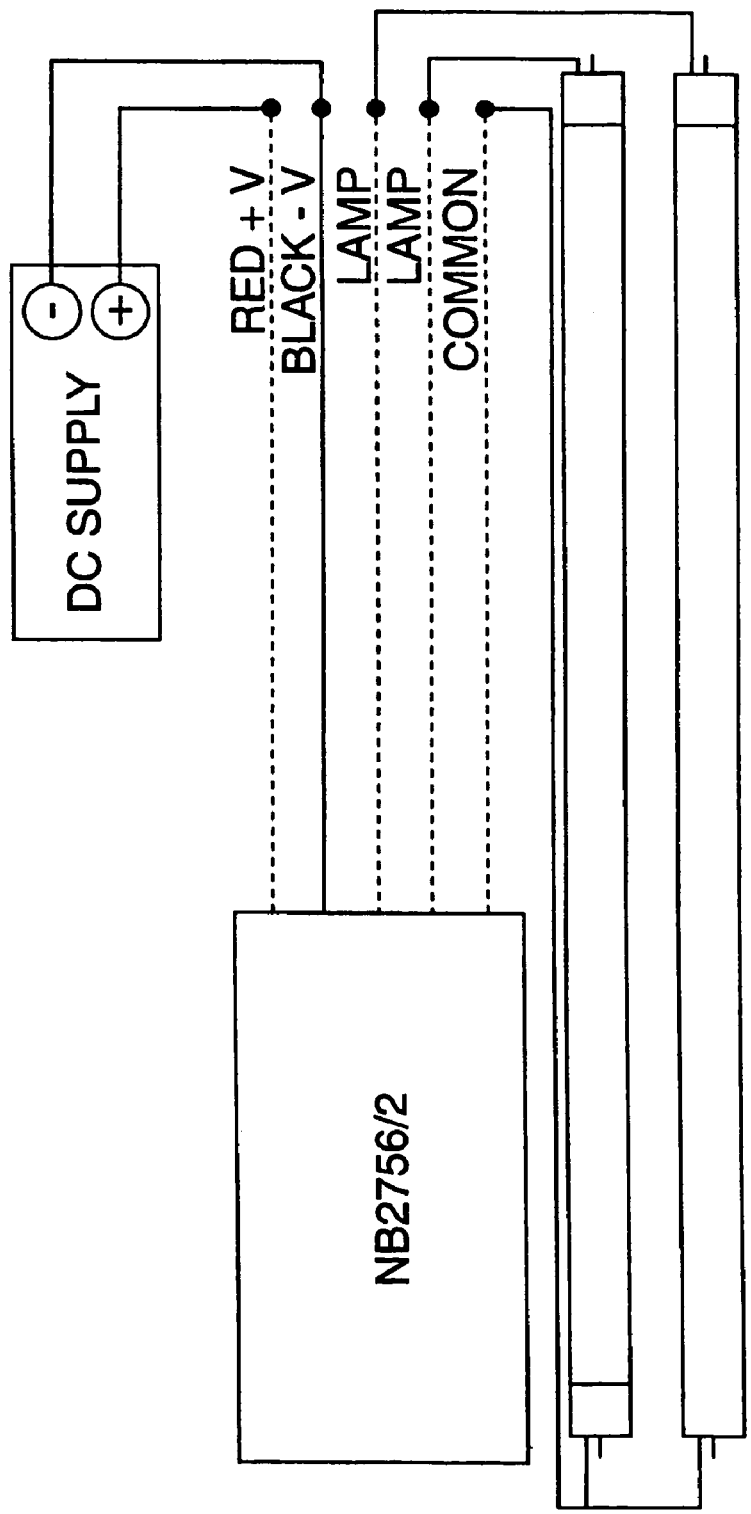
FIG. 7 is a wiring diagram and specs for two lamp ballast.
Figure 8:
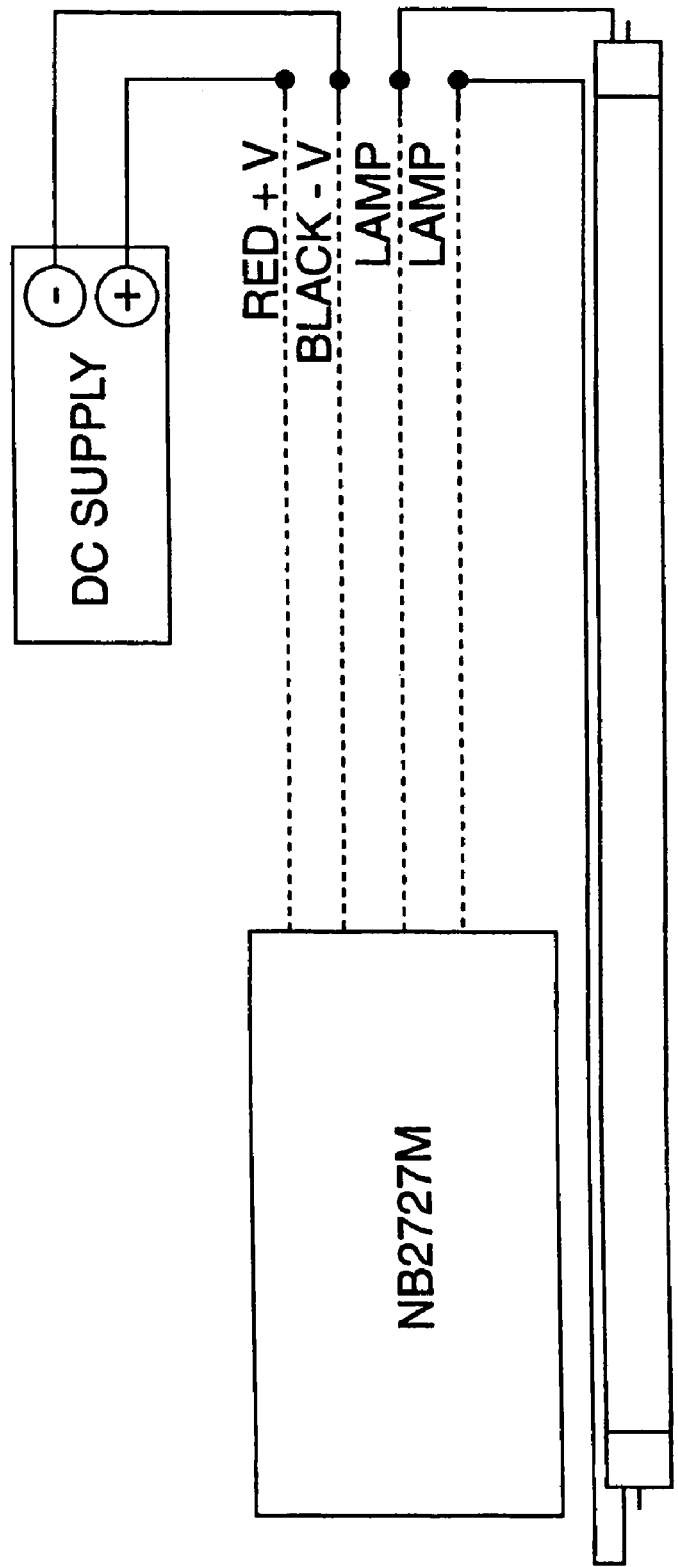
FIG. 8 is a wiring diagram and specs for single lamp ballast.

FIGS. 7 and 8 show the wiring diagrams and specifications for the two lamp and one lamp DC ballasts respectively (designated as NB2756/2 and NB2727M respectively).

Figure 9:
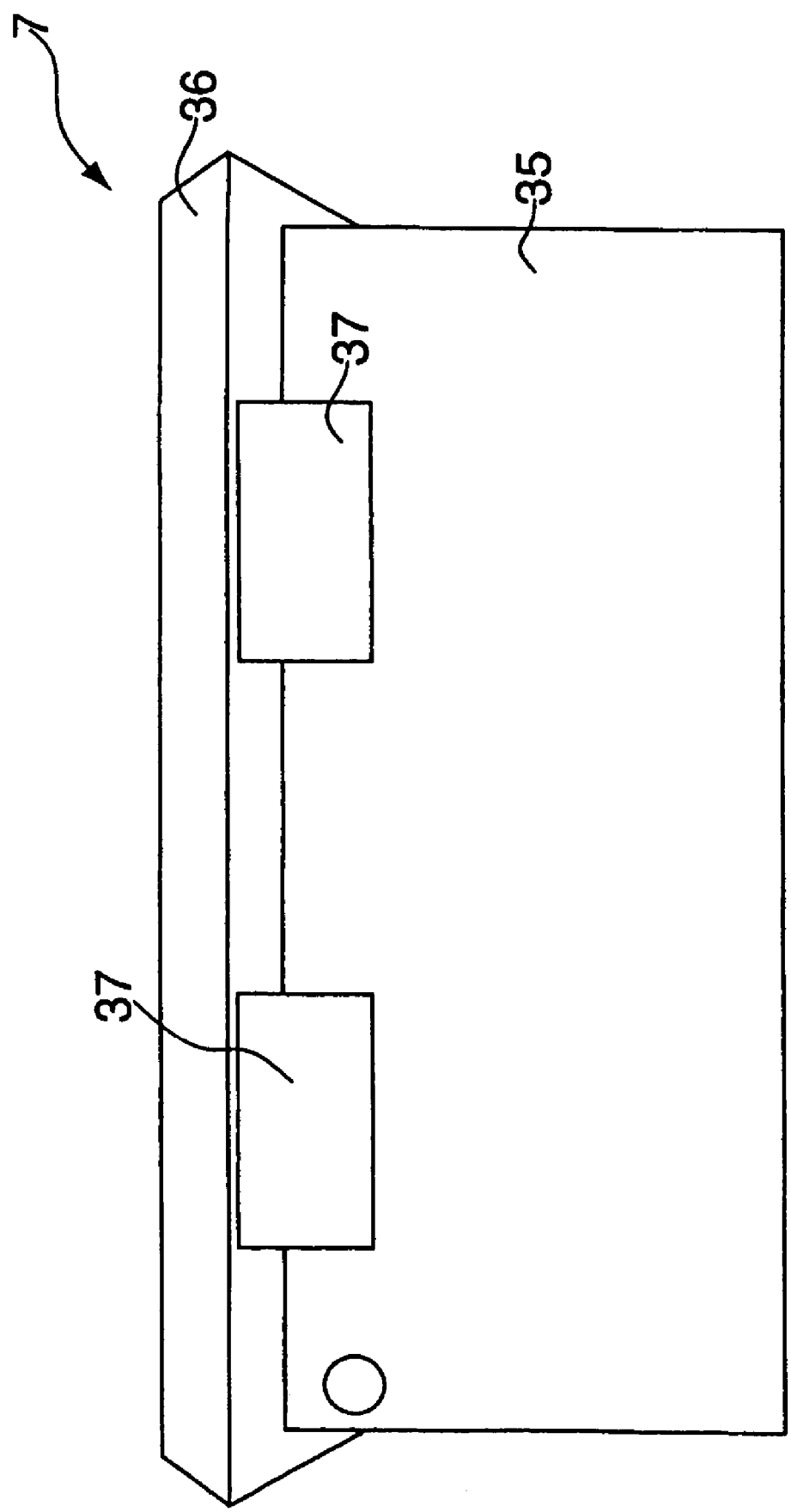
FIG. 9 is a front view of battery enclosure.

FIG. 9 shows a front view of the battery case with hinged lid 36 and latches 37. It is a thermoplastic case rated only for sealed type lead acid batteries.

Figure 10:
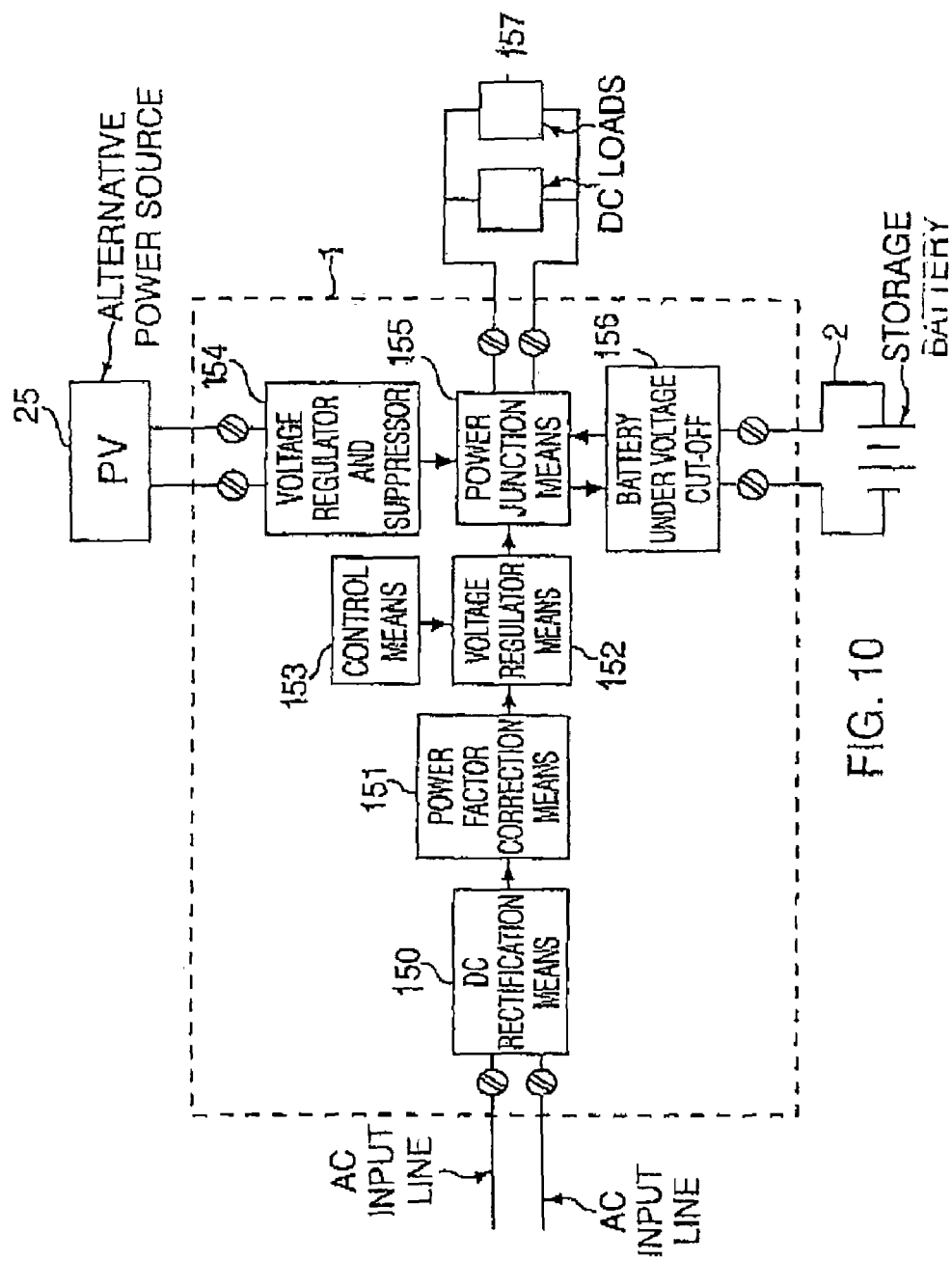
FIG. 10 is a block diagram of power control unit.

FIG. 10 shows a block diagram of the PCU 1. The AC input is rectified by DC Rectifier Means 150 such as a bridge circuit. The Power Factor Correction Means 151 is used to achieve a high power factor (0.99) at the AC input. The Control Means 153 and Voltage Regulator means 152 interact through circuits such as pulse width modulation and DC to DC switching power supply topologies to provide the nominal 26.6 volts to the lighting ballasts or other suitable DC loads 157 through the power junction means 155. Other voltages are also possible, such as 13.3, 26.6, 39.9 etc.

The Battery Undervoltage Cut-Off 156 disconnects the battery 2 in situations of depletion to prevent "over sulfation" or chemical and physical damage to the storage battery. The PV Voltage Regulator and Suppressor 154 is a power conditioner block to suppress voltage transients (such as from lightning strikes in the vicinity) and also to prevent over charging of the storage battery from the PV panel 25.

An embodiment of control means 153 determines if the utility power drawn is above a manually pre-set threshold or a threshold derived from an automatic setpoint circuit. If the utility power drawn exceeds this threshold, voltage regulator means 152 output voltage will be set such that power junction means 155 will be biased accordingly such that power to DC loads 157 will be drawn from storage battery 2 and/or PV source 25 through its PV voltage and suppressor 154. In this manner, AC power peaks from the utility are reduced as are monthly utility charges if a peak power surcharge is assigned. The power sharing between PV source 25 and battery 2 is regulated by the output voltage of PV source 25 as modified by PV voltage regulator and suppressor 154. The interaction of voltage output at suppressor 154 with that of battery 2 voltage via biasing within power junction means 155 determines the level of power sharing between these DC secondary sources. The latter action also describes the sharing of power between PV panel 25 and battery 2 during periods of utility power outage.

FIG. 11 is an alternate embodiment for a loadside powered lighting system including natural gas in a cogeneration component. AC power 50 is normally converted to DC power by DC power converter 51 and control means 52. However, a cogenerator in the form of a DC gas generator 53 receives natural gas from a natural gas source 54, and sends DC power to building lighting system 55, such as electronic ballasted fluorescent lighting. This system provides a flatter and more predictable power demand for electric utility customers at building lighting system 55, since it supplants peak power from electric utility generating sources. This results in reduced demand charges, since gas offers a lower cost per unit of energy consumed, compared to conventional AC power from a public utility.

The cogeneration system can run continuously for lighting load 55, without having to be sent back to AC line power 50, which avoids the need for costly AC synchronization methods and sine wave purity, as is needed when sending excess electricity back to a public utility.

DC gas generator 53 directly couples to building lighting system 55 through a diode isolator that allows either AC or DC power to operate building lighting system 55.

Other modifications may be made to the present invention without departing from the scope of the invention, as noted in the appended claims.

I claim:

1. A power sharing system in a DC load environment comprising:
   a primary source of AC;
   an alternative primary source of DC;
   a power controller capable of inputting voltage regulated DC power simultaneously from said primary sources, said alternative primary source of DC making a shared contribution of power selected by said power controller, and having a power junction means for delivering a regulated voltage DC to at least one DC compatible load at an output of said power sharing system;
   said power controller controlling supply side power sharing to a DC load side;
   said power controller having a converter converting AC inputted electrical power into a defined DC-regulated voltage to provide and manage power to said DC compatible load;
   said power controller producing voltage regulated power controlling response of said alternative primary source of DC power; and,
   said power controller capable of altering the input voltages of said power junction means for directing power from said alternate primary source of DC power to limit peak power supplied from said primary source of AC power to said at least one DC compatible load in accordance with a pre-set threshold of power from said primary source of AC power in order to minimize peak power surcharges.

2. The power system of claim 1 wherein said DC compatible load is a lighting system.

3. The power system of claim 1 wherein said alternative primary source of DC power is an energy storage medium.

4. The power system of claim 1 wherein said alternative primary source of DC is a photo voltaic energy source.

5. The power system of claim 1 wherein said alternative primary source of DC is a cogenerator.

6. The power system of claim 1 wherein said alternative primary source of DC is a wind energy/electric energy conversion system.

7. The power system as in claim 1 in which said power controller contains circuitry for providing power to said at least one DC compatible load from said alternative primary source of DC in the absence of power from said primary source of AC.

8. A power controller for use in a high efficiency lighting system for maintaining normal lighting conditions through lighting fixtures requiring DC electrical power comprising:
- an AC connection for receiving AC electrical power from a grid source and an output connection for delivering required DC electrical power to said lighting fixtures;
- a power controller capable of converting and outputting voltage regulated DC power simultaneously from said AC grid source, at least one alternative source of DC power making a shared contribution of power selected by said power controller, said controller influencing the amount of power coming from each respective source by adjusting the DC output voltage of each respective source directed to a power junction means for delivering said required DC electrical power to said lighting fixtures at an output of said power sharing system;
- said power controller voltage influencing the proportion of power coming from multiple sources to said lighting fixtures;
- a converter converting said AC electrical power to DC electrical power; and,
- said power controller delivering said required DC electrical power from said at least one alternate source of DC to said lighting fixtures during an AC electrical power outage to maintain without interruption normal lighting by said lighting fixtures.

* * * * *